United States Patent
Sato

(10) Patent No.: US 9,145,132 B2
(45) Date of Patent: Sep. 29, 2015

(54) VEHICLE AND DETERIORATION DIAGNOSIS METHOD FOR POWER STORAGE DEVICE

(75) Inventor: Keita Sato, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 18 days.

(21) Appl. No.: 14/002,633

(22) PCT Filed: Mar. 16, 2011

(86) PCT No.: PCT/JP2011/056189
§ 371 (c)(1),
(2), (4) Date: Aug. 30, 2013

(87) PCT Pub. No.: WO2012/124070
PCT Pub. Date: Sep. 20, 2012

(65) Prior Publication Data
US 2013/0338867 A1    Dec. 19, 2013

(51) Int. Cl.
| | | |
|---|---|---|
| *B60W 20/00* | (2006.01) |
| *B60W 10/06* | (2006.01) |
| *B60W 10/08* | (2006.01) |
| *B60W 10/26* | (2006.01) |
| *B60K 6/445* | (2007.10) |
| *B60W 50/02* | (2012.01) |

(52) U.S. Cl.
CPC .............. *B60W 20/108* (2013.01); *B60K 6/445* (2013.01); *B60W 10/06* (2013.01); *B60W 10/08* (2013.01); *B60W 10/26* (2013.01); *B60W 20/00* (2013.01); *B60W 20/50* (2013.01); *B60W 50/0205* (2013.01); *B60W 20/106* (2013.01); *Y02T 10/6239* (2013.01); *Y02T 10/6286* (2013.01); *Y10S 903/903* (2013.01)

(58) Field of Classification Search
CPC .............................. B60K 6/445; B60W 10/06
USPC ........................ 701/22; 903/903; 180/65.28
See application file for complete search history.

(56) References Cited

U.S. PATENT DOCUMENTS

| | | | | |
|---|---|---|---|---|
| 5,656,916 | A  * | 8/1997  | Hotta ............................ | 320/160 |
| 8,039,976 | B2 * | 10/2011 | Sato et al. ..................... | 290/40 C |
| 2002/0074173 | A1* | 6/2002 | Morimoto et al. ........... | 180/65.2 |
| 2006/0035115 | A1* | 2/2006 | Norimatsu et al. .............. | 429/9 |
| 2007/0210769 | A1* | 9/2007 | Tsutsumi et al. ............. | 323/269 |
| 2008/0053715 | A1* | 3/2008 | Suzuki et al. .................. | 180/2.1 |
| 2009/0024267 | A1* | 1/2009 | Kawai ............................ | 701/22 |

(Continued)

FOREIGN PATENT DOCUMENTS

| | | | |
|---|---|---|---|
| JP | 2000-131404 A | 5/2000 |
| JP | 2000324616 A | 11/2000 |

(Continued)

OTHER PUBLICATIONS

Toyota Technical Publications, "Overcharge Detection Circuit", Jun. 30, 2009, pp. 307-308.

*Primary Examiner* — Thomas G Black
*Assistant Examiner* — Wae Louie
(74) *Attorney, Agent, or Firm* — Sughrue Mion, PLLC

(57) ABSTRACT

An ECU executes a program including the steps of: prohibiting startup of an engine when there is a request for execution of a deterioration diagnosis process and when the deterioration diagnosis process is in execution; and releasing prohibition of startup of the engine when the deterioration diagnosis process is completed.

9 Claims, 6 Drawing Sheets

(56) References Cited

U.S. PATENT DOCUMENTS

| | | |
|---|---|---|
| 2009/0038867 A1* | 2/2009 | Jufuku et al. .............. 180/65.31 |
| 2010/0001523 A1 | 1/2010 | Sato et al. |
| 2013/0338867 A1* | 12/2013 | Sato .............................. 701/22 |

FOREIGN PATENT DOCUMENTS

| | | |
|---|---|---|
| JP | 2001235525 A | 8/2001 |
| JP | 200297974 A | 4/2002 |
| JP | 2008-39526 A | 2/2008 |
| JP | 2008-215310 A | 9/2008 |
| JP | 2009-137308 A | 6/2009 |
| JP | 2009-234557 A | 10/2009 |
| JP | 2009228464 A | 10/2009 |
| JP | 2009-274527 A | 11/2009 |
| JP | 2011-25860 A | 2/2011 |

* cited by examiner

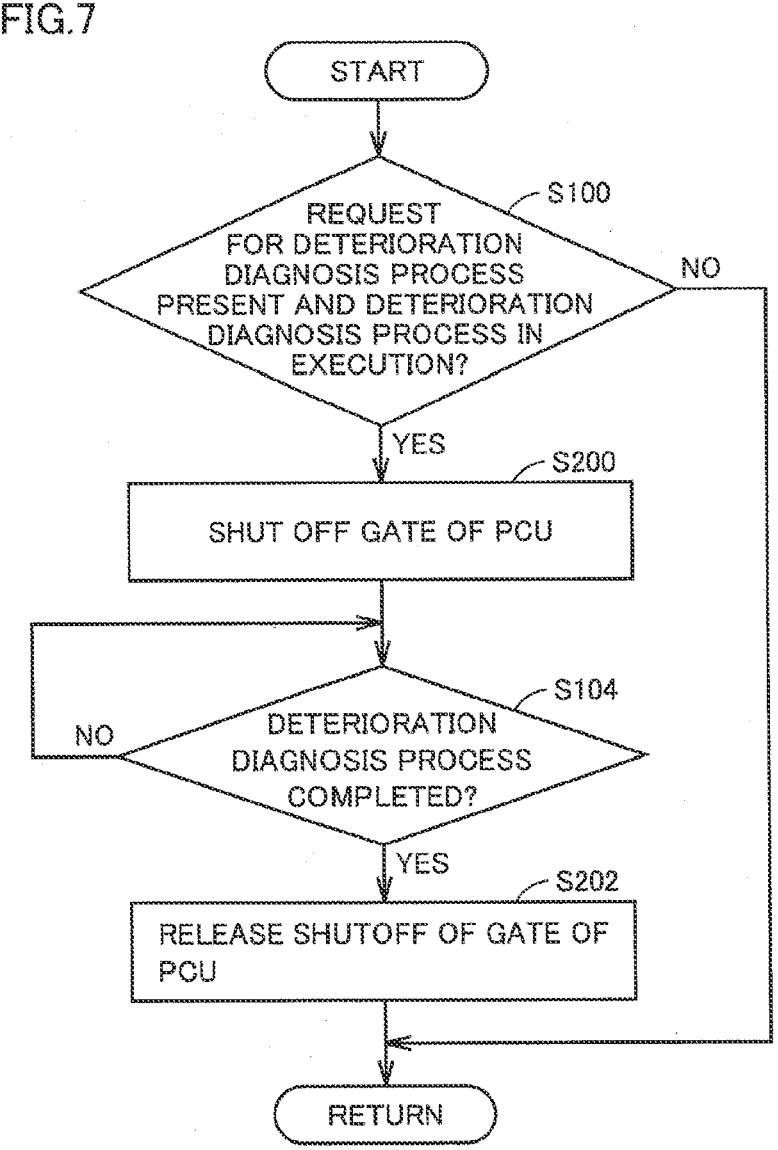

VEHICLE AND DETERIORATION DIAGNOSIS METHOD FOR POWER STORAGE DEVICE

CROSS REFERENCE TO RELATED APPLICATIONS

This application is a National Stage of International Application No. PCT/JP2011/056189 filed Mar. 16, 2011, the contents of all of which are incorporated herein by reference in their entirety.

TECHNICAL FIELD

The present invention relates to deterioration diagnosis of a power storage device mounted on a vehicle.

BACKGROUND ART

There is known a hybrid vehicle including an internal combustion engine, a drive motor, and a power storage device for supplying power to the drive motor. In such a vehicle, it is necessary to diagnose, with high accuracy, whether the power storage device has deteriorated or not.

Japanese Patent Laying-Open No. 2000-131404 discloses a deterioration degree determining apparatus for diagnosing whether a power storage device has deteriorated or not, based on an amount of discharge from a fully-charged state to a prescribed discharge voltage value.

CITATION LIST

Patent Document

PTD 1: Japanese Patent Laying-Open No. 2000-131404

SUMMARY OF INVENTION

Technical Problem

However, when the internal combustion engine starts up during deterioration diagnosis of the power storage device, a voltage of the power storage device fluctuates, and thus, the amount of discharge cannot be calculated with high accuracy. Therefore, it may not be able to be diagnosed precisely whether the power storage device has deteriorated or not. Consequently, an opportunity to conduct deterioration diagnosis with high accuracy cannot be ensured sufficiently in some cases.

With the deterioration degree determining apparatus disclosed in the above-described publication, such a problem is not considered at all, and thus cannot be solved.

The present invention has been made to solve the above-described problem, and an object of the present invention is to provide a vehicle and a deterioration diagnosis method for a power storage device, for determining, with high accuracy, whether the power storage device has deteriorated or not.

Solution to Problem

A vehicle according to an aspect of the present invention includes: an internal combustion engine; a power storage device; a rotating electric machine for receiving supply of power from the power storage device and starting up the internal combustion engine; a detection unit for detecting a state of the power storage device; and a control unit for executing a deterioration diagnosis process for diagnosing whether the power storage device has deteriorated or not based on the state of the power storage device, when a prescribed condition is satisfied. The control unit suppresses startup of the internal combustion engine when a condition for starting up the internal combustion engine is satisfied before the deterioration diagnosis process is completed.

Preferably, the control unit prohibits startup of the internal combustion engine until the deterioration diagnosis process is completed.

Further preferably, the control unit delays startup of the internal combustion engine until the deterioration diagnosis process is completed.

Further preferably, the control unit releases suppression of startup of the internal combustion engine when the deterioration diagnosis process is completed.

Further preferably, when the prescribed condition is satisfied, the control unit diagnoses whether the power storage device has deteriorated or not, based on any one of an amount of charge and an amount of discharge of the power storage device when a voltage of the power storage device is changed from a diagnosis start voltage to a diagnosis end voltage.

Further preferably, the control unit suppresses startup of the internal combustion engine while the voltage of the power storage device is being changed from the diagnosis start voltage to the diagnosis end voltage.

Further preferably, the control unit suppresses startup of the internal combustion engine while the voltage of the power storage device is being changed from a prescribed voltage between the diagnosis start voltage and the diagnosis end voltage to the diagnosis end voltage.

Further preferably, the vehicle further includes: a power conversion device for converting power of the power storage device into power supplied to the rotating electric machine. The control unit suppresses startup of the internal combustion engine by controlling the power conversion device to interrupt supply of the power to the rotating electric machine.

A deterioration diagnosis method for a power storage device according to another aspect of the present invention is a deterioration diagnosis method for a power storage device, used in a vehicle including an internal combustion engine, a power storage device, and a rotating electric machine for receiving supply of power from the power storage device and starting up the internal combustion engine. The deterioration diagnosis method includes the steps of: detecting a state of the power storage device; executing a deterioration diagnosis process for diagnosing whether the power storage device has deteriorated or not based on the state of the power storage device, when a prescribed condition is satisfied; and suppressing startup of the internal combustion engine when a condition for starting up said internal combustion engine is satisfied before the deterioration diagnosis process is completed.

Advantageous Effects of Invention

According to the present invention, startup of the internal combustion engine is suppressed until the deterioration diagnosis process for the power storage device is completed. Therefore, voltage fluctuations in the power storage device caused when the internal combustion engine starts up are suppressed. Since the voltage fluctuations in the power storage device are suppressed, a sum of discharge can be calculated with high accuracy during execution of the deterioration diagnosis process. Consequently, it can be precisely diagnosed whether the power storage device has deteriorated or not. Furthermore, since startup of the internal combustion engine is suppressed, an opportunity to conduct deterioration diagnosis with high accuracy can be ensured. Therefore, there can be provided a vehicle and a deterioration diagnosis method for a power storage device, for determining, with high accuracy, whether the power storage device has deteriorated or not.

BRIEF DESCRIPTION OF DRAWINGS

FIG. 7 is a flowchart showing a control structure of a program executed by the ECU mounted on the vehicle according to the second embodiment.

DESCRIPTION OF EMBODIMENTS

Embodiments of the present invention will be described hereinafter, with reference to the drawings. In the following description, the same components are denoted by the same symbols. The names and functions thereof are also the same. Accordingly, detailed description thereof will not be repeated.

First Embodiment

Figure 1:
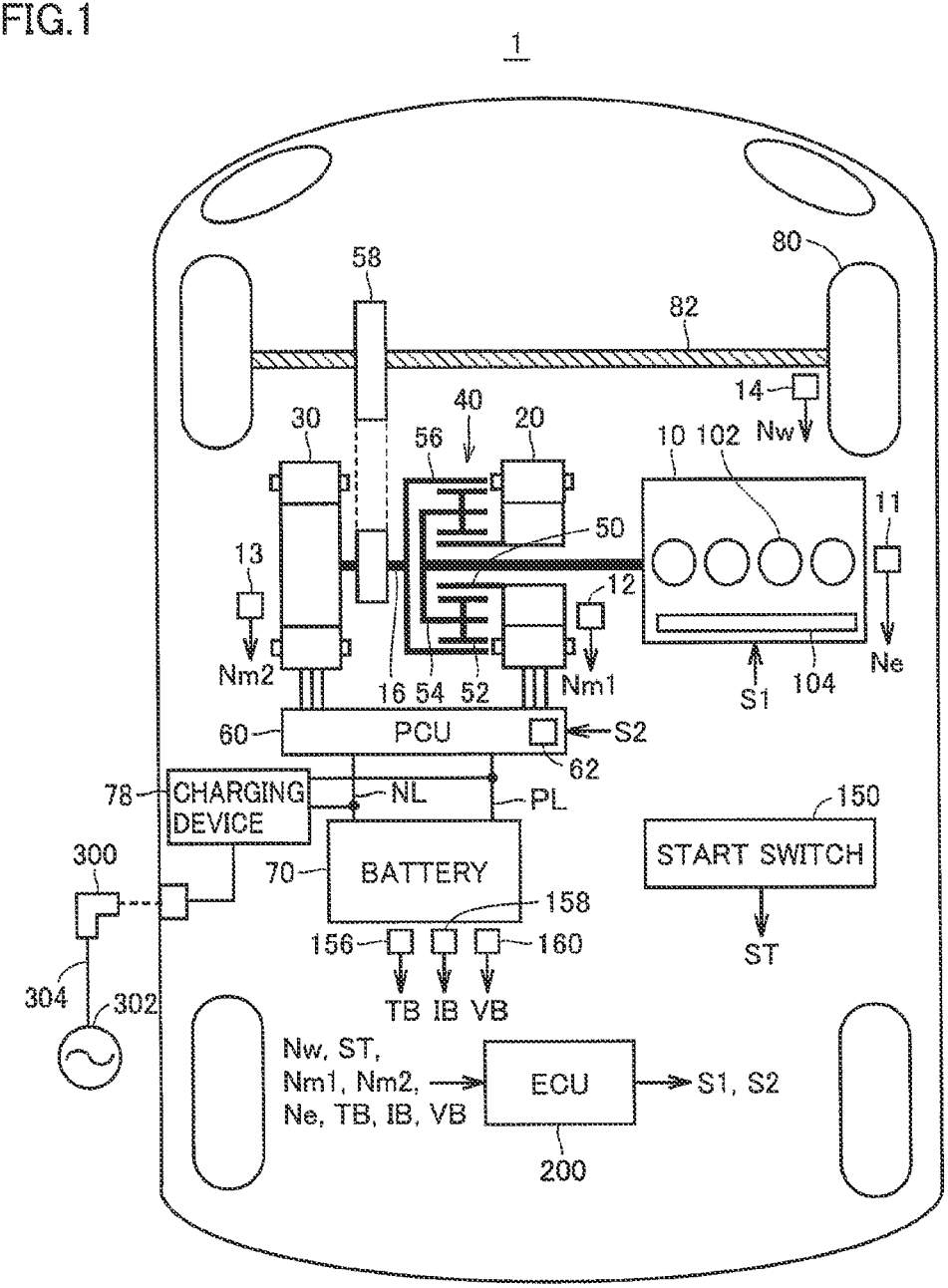
FIG. 1 is an overall block diagram of a vehicle according to a first embodiment.

Referring to FIG. 1, an overall block diagram of a vehicle 1 according to the present embodiment will be described. Vehicle 1 includes an engine 10, a drive shaft 16, a first motor generator (hereinafter referred to as first MG) 20, a second motor generator (hereinafter referred to as second MG) 30, a power split device 40, a speed reducer 58, a PCU (Power Control Unit) 60, a battery 70, a charging device 78, drive wheels 80, a start switch 150, and an ECU (Electronic Control Unit) 200.

Vehicle 1 travels with driving force output from at least one of engine 10 and second MG 30. Motive power generated by engine 10 is split for two paths by power split device 40. Of the two paths, one is a path for transmission via speed reducer 58 to drive wheels 80, and the other is a path for transmission to first MG 20.

First MG 20 and second MG 30 are, for example, three-phase AC rotating electric machines. First MG 20 and second MG 30 are driven by PCU 60.

First MG 20 has a function as a generator which generates power using motive power of engine 10 split by power split device 40, to charge battery 70 via PCU 60. In addition, receiving power from battery 70, first MG 20 rotates a crankshaft of engine 10 which serves as an output shaft. First MG 20 thereby has a function as a starter which starts up engine 10.

Second MG 30 has a function as a drive motor which provides driving force for drive wheels 80 using at least any one of power stored in battery 70 and power generated by first MG 20. In addition, second MG 30 has a function as a generator for charging battery 70 via PCU 60 with the use of power generated through regenerative braking.

Engine 10 is, for example, an internal combustion engine such as a gasoline engine and a diesel engine. Engine 10 includes a plurality of cylinders 102 and a fuel injection device 104 which supplies fuel to each of the plurality of cylinders 102. Based on a control signal S1 from ECU 200, fuel injection device 104 injects an appropriate amount of fuel for each cylinder with appropriate timing and stops injecting fuel for each cylinder.

For the detection of the rotational speed of the crankshaft of engine 10 (hereinafter referred to as engine rotational speed) Ne, engine 10 is further provided with an engine rotational speed sensor 11. Engine rotational speed sensor 11 transmits a signal indicating detected engine rotational speed Ne to ECU 200.

Power split device 40 mechanically couples together three elements for rotating drive wheels 80: drive shaft 16, the output shaft of engine 10, and a rotation shaft of first MG 20. Power split device 40 utilizes any one of the above-indicated three elements as a reaction force element, thereby allowing for the transfer of motive power between the other two elements. A rotation shaft of second MG 30 is coupled to drive shaft 16.

Power split device 40 is a planetary gear mechanism including a sun gear 50, pinion gears 52, a carrier 54, and a ring gear 56. Pinion gear 52 engages with each of sun gear 50 and ring gear 56. Carrier 54 supports pinion gears 52 in a manner to allow them to rotate, and is coupled to a crankshaft of engine 10. Sun gear 50 is coupled to the rotation shaft of first MG 20. Ring gear 56 is coupled via drive shaft 16 to the rotation shaft of second MG 30 and speed reducer 58.

Speed reducer 58 transfers motive power from power split device 40 and second MG 30 to drive wheels 80. In addition, speed reducer 58 transfers reaction force received by drive wheels 80 from a road surface, to power split device 40 and second MG 30.

PCU 60 includes a plurality of switching elements 62. By controlling ON/OFF operation of switching elements 62, PCU 60 converts DC power stored in battery 70 into AC power for driving first MG 20 and second MG 30. PCU 60 includes a converter and an inverter (both not shown) which are controlled based on a control signal S2 from ECU 200. The converter boosts a voltage of DC power received from battery 70 and outputs the boosted power to the inverter. The inverter converts the DC power output from the converter into AC power for output to first MG 20 and/or second MG 30. First MG 20 and/or second MG 30 are thus driven by using the power stored in battery 70. In addition, the inverter converts AC power generated by first MG 20 and/or second MG 30 into DC power and outputs it to the converter. The converter steps down a voltage of the DC power output by the inverter and outputs the stepped down power to battery 70. Battery 70 is thereby charged with the use of the power generated by first MG 20 and/or second MG 30. It is noted that the converter may be omitted.

Battery 70 is a power storage device and a rechargeable DC power supply. In the present embodiment, a lithium ion battery is, for example, described as battery 70 by way of example. However, battery 70 is not particularly limited to a lithium ion battery and may be, for example, any battery that can deteriorate. Battery 70 may be a secondary battery such as a nickel-metal hydride battery and a lead storage battery, for example. In addition, battery 70 is not limited to a secondary battery, and may be anything that can generate a DC voltage, such as a capacitor, a solar cell, and a fuel cell, for example.

Battery 70 has a voltage of the order of 200 V, for example. Battery 70 may be charged, other than with the use of the power generated by first MG 20 and/or second MG 30 as described above, with the use of power supplied from an external power supply (not shown).

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push switch. Start switch 150 may be one that allows a key to be inserted into a key cylinder and rotated to a prescribed position. Start switch 150 is connected to ECU 200. In response to an operation of start switch 150 by a driver, start switch 150 transmits a signal ST to ECU 200.

ECU 200 determines that a start command has been received when, for example, signal ST has been received while the system of vehicle 1 is in a stop state, and then ECU 200 shifts the system of vehicle 1 from the stop state to a startup state. In addition, ECU 200 determines that a stop command has been received when signal ST has been received while the system of vehicle 1 is in the startup state, and then ECU 200 shifts the system of vehicle 1 from the startup state to the stop state. In the following descriptions, operation of start switch 150 by the driver when the system of vehicle 1 is in the startup state will be referred to as an IG OFF operation, and operation of start switch 150 by the driver when the system of vehicle 1 is in the stop state will be referred to as an IG ON operation. Once the system of vehicle 1 shifts to the startup state, for example, a plurality of pieces of equipment necessary for vehicle 1 to travel are supplied with power, and then enter an operable state. In contrast, once the system of vehicle 1 shifts to the stop state, for example, part of the plurality of pieces of equipment necessary for vehicle 1 to travel are no longer supplied with power, and then enter an operation stop state.

A first resolver 12 is provided at first MG 20. First resolver 12 detects rotational speed Nm1 of first MG 20. A second resolver 13 is provided at second MG 30. First resolver 12 transmits a signal indicating detected rotational speed Nm1 to ECU 200. Second resolver 13 detects rotational speed Nm2 of second MG 30. Second resolver 13 transmits a signal indicating detected rotational speed Nm2 to ECU 200.

A drive shaft 82 between speed reducer 58 and drive wheels 80 is provided with a wheel speed sensor 14. Wheel speed sensor 14 detects rotational speed Nw of drive wheels 80. Wheel speed sensor 14 transmits a signal indicating detected rotational speed Nw to ECU 200. ECU 200 calculates vehicle speed V based on rotational speed Nw received. It is noted that ECU 200 may calculate vehicle speed V based on rotational speed Nm2 of second MG 30 instead of rotational speed Nw.

When a charging plug 300 is attached to vehicle 1, charging device 78 charges battery 70 with the use of power supplied from an external power supply 302. Charging plug 300 is connected to one end of a charging cable 304. The other end of charging cable 304 is connected to external power supply 302. A positive electrode terminal of charging device 78 is connected to a power supply line PL connecting a positive electrode terminal of PCU 60 and a positive electrode terminal of battery 70. A negative electrode terminal of charging device 78 is connected to an earth line NL connecting a negative electrode terminal of PCU 60 and a negative electrode terminal of battery 70.

ECU 200 generates control signal S1 for controlling engine 10 and outputs generated control signal S1 to engine 10. Further, ECU 200 generates control signal S2 for controlling PCU 60 and outputs generated control signal S2 to PCU 60.

By controlling engine 10, PCU 60, and the like, ECU 200 controls the entire hybrid system, that is, a state of charging/discharging of battery 70 and states of operation of engine 10, first MG 20 and second MG 30 such that vehicle 1 can travel most efficiently.

ECU 200 calculates requested driving force which corresponds to an amount of depression of an accelerator pedal (not shown) provided at a driver's seat. ECU 200 controls torque of first MG 20 and second MG 30, and an output of engine 10, in accordance with the calculated requested driving force.

Vehicle 1 having a configuration as described above travels solely on second MG 30 when engine 10 is inefficient at the start of traveling or during low-speed traveling. In addition, during normal traveling, for example, power split device 40 divides motive power of engine 10 into two paths of motive power. Motive power in one path directly drives drive wheels 80. Motive power in the other path drives first MG 20 to generate power. At this time, ECU 200 uses generated power to drive second MG 30. In this way, by driving second MG 30, assistance in driving drive wheels 80 is provided.

When vehicle 1 reduces its speed, regenerative braking is performed with second MG 30, which follows the rotation of drive wheels 80, functioning as a generator. The power recovered through regenerative braking is stored in battery 70. It is noted that when remaining capacitance (hereinafter referred to as SOC (State of Charge)) of the power storage device has lowered and is particularly in need of charging, ECU 200 increases an output of engine 10 to increase an amount of power generated by first MG 20. The SOC of battery 70 is thereby increased. In addition, even during low-speed traveling, ECU 200 may exert control for increasing driving force from engine 10 as necessary, for example, such as when battery 70 is in need of charging as described above, when auxiliary machinery such as an air conditioner is to be driven, and when the temperature of cooling water for engine 10 is to be raised to a prescribed temperature.

In controlling amounts of charge and discharge of battery 70, ECU 200 sets, based on battery temperature TB and the current SOC, allowable input power in charging battery 70 (hereinafter referred to as "charge power upper limit value Win") and allowable output power in discharging battery 70 (hereinafter referred to as "discharge power upper limit value Wout"). For instance, as the current SOC gets lower, discharge power upper limit value Wout is gradually set lower. In contrast, as the current SOC gets higher, charge power upper limit value Win is gradually set lower.

In addition, the secondary battery used as battery 70 has temperature dependence that causes an increase in internal resistance at low temperatures. In addition, at high temperatures, it is necessary to prevent an overincrease in temperature caused by further heat generation. It is therefore preferable to lower each of discharge power upper limit value Wout and charge power upper limit value Win when battery temperature TB is low and when battery temperature TB is high. ECU 200 sets charge power upper limit value Win and discharge power upper limit value Wout in accordance with battery temperature TB and the current SOC, for example, through the use of a map or the like.

In vehicle 1 having the configuration described above, it is necessary to diagnose, with high accuracy, whether battery 70 has deteriorated or not. Therefore, when prescribed conditions are satisfied, ECU 200 executes a deterioration diagnosis process for diagnosing whether battery 70 has deteriorated or not based on an amount of discharge. However, when engine 10 starts up during execution of the deterioration diagnosis process for battery 70, a voltage of battery 70 fluctuates, and thus, the amount of discharge of battery 70 cannot be in some cases calculated with high accuracy. Therefore, it cannot be in some cases diagnosed precisely whether battery 70 has deteriorated or not.

Accordingly, the present embodiment has a feature in that ECU 200 suppresses startup of engine 10 when a condition for starting up engine 10 is satisfied before the deterioration diagnosis process for diagnosing whether battery 70 has deteriorated or not is completed.

Figure 2:
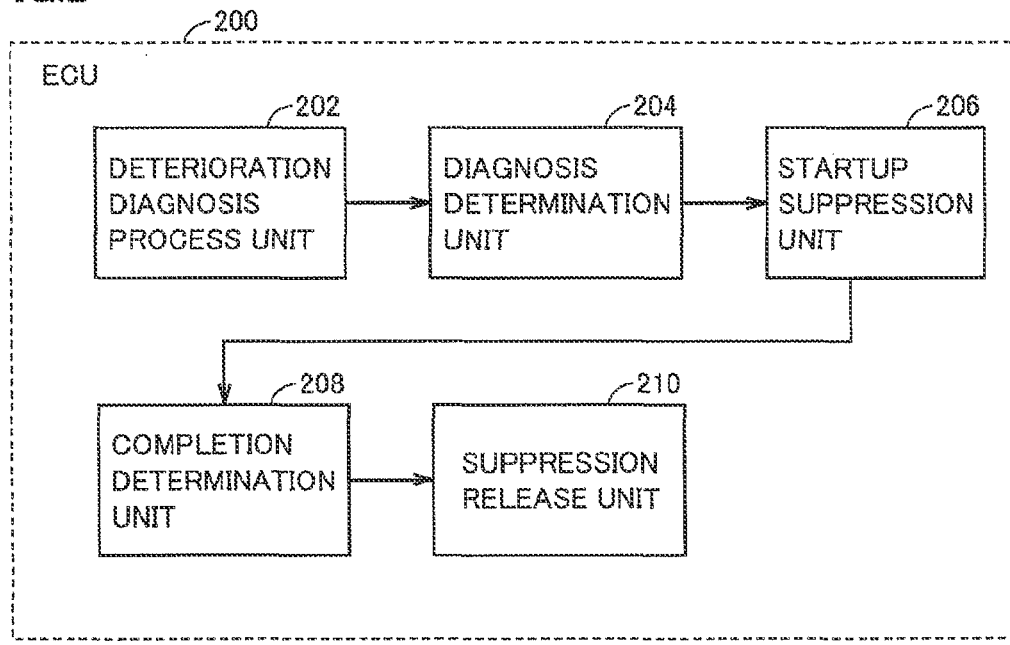
FIG. 2 is a functional block diagram of an ECU mounted on the vehicle according to the first embodiment.

FIG. 2 shows a functional block diagram of ECU 200 mounted on the vehicle according to the present embodiment. ECU 200 includes a deterioration diagnosis process unit 202, a diagnosis determination unit 204, a startup suppression unit 206, a completion determination unit 208, and a suppression release unit 210.

When there is a request for execution of the deterioration diagnosis process for diagnosing whether battery 70 has deteriorated or not, deterioration diagnosis process unit 202 executes the deterioration diagnosis process on the condition that the prescribed conditions are satisfied.

The case where there is a request for execution of deterioration diagnosis refers to, for example, a case where after vehicle 1 was manufactured or after battery 70 was replaced with a new battery, prescribed years have elapsed, during which there is a possibility that battery 70 has deteriorated. Alternatively, the case where there is a request for execution of deterioration diagnosis refers to, for example, a case where after the aforementioned prescribed years elapsed, a prescribed period has further elapsed without replacing battery 70. Alternatively, the case where there is a request for execution of deterioration diagnosis refers to a case where there is a request from a user or an operator of vehicle 1.

The user or the operator may request vehicle 1 to execute the deterioration diagnosis process by, for example, performing a prescribed special operation, which is different from the normal operation, of the equipment (such as an accelerator pedal, a brake pedal or various switches) mounted on vehicle 1. The user or the operator may request vehicle 1 to execute the deterioration diagnosis process by connecting a prescribed device (e.g., an abnormality diagnosis device) to vehicle 1 and performing a prescribed operation of this device.

In the present embodiment, the prescribed conditions are described as including, for example, a condition that battery temperature TB is equal to or higher than a threshold value TB(0) and a condition that an OCV (Open Circuit Voltage) of battery 70 is equal to or higher than a threshold value OCV(0).

Threshold value TB(0) is a threshold value for determining whether a diagnosis result is affected by voltage fluctuations caused by the internal resistance of battery 70 or not. Thus, by executing the deterioration diagnosis process when the condition that battery temperature TB is equal to or higher than threshold value TB(0) is satisfied, the influence of voltage fluctuations caused by the internal resistance of battery 70 on the diagnosis result can be avoided.

Deterioration diagnosis process unit 202 estimates the OCV of battery 70 based on voltage VB and battery temperature TB. Deterioration diagnosis process unit 202 estimates the OCV which corresponds to voltage VB and battery temperature TB detected, for example, using a map and the like showing a relationship among voltage VB, battery temperature TB and the OCV. In addition to voltage VB and battery temperature TB, deterioration diagnosis process unit 202 may estimate the OCV based on, for example, the SOC of battery 70, the deterioration degree of battery 70 and the like.

Threshold value OCV(0) is a diagnosis start voltage. A value at which it is possible to ensure a sum of discharge that allows acquisition of a diagnosis result with sufficient accuracy can be determined as threshold value OCV(0). The sum of discharge refers to an integrated value of the amount of discharge (discharging current) when battery 70 is discharged at a fixed amount of discharge from diagnosis start voltage OCV(0) to a diagnosis completion voltage OCV(1).

Preferably, it is desirable that threshold value OCV(0) should be a value close to the SOC corresponding to the fully-charged state (upper limit value) of battery 70. In addition, preferably, it is desirable that diagnosis completion voltage OCV(1) should be a value close to the SOC corresponding to a lower limit value of the SOC of battery 70. With this, the diagnosis accuracy can be improved. The threshold value of the OCV, which is the prescribed condition, may also be a value larger than OCV(0).

Figure 3:
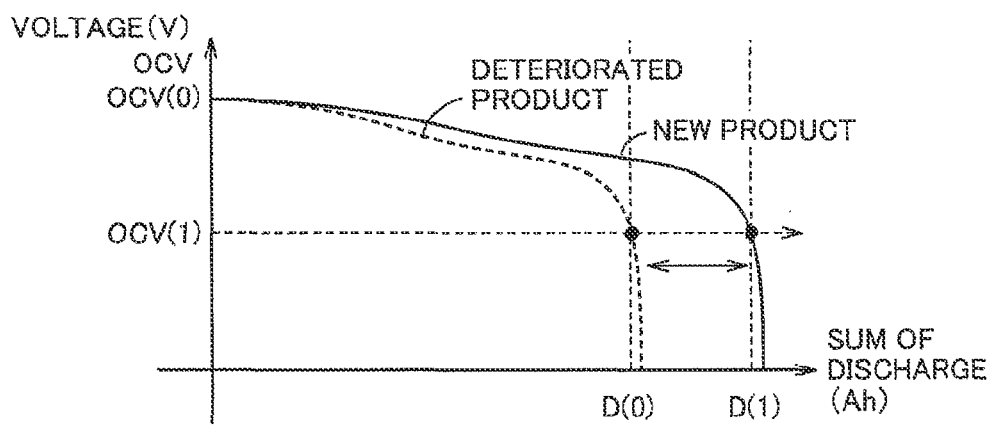
FIG. 3 is a graph for describing a deterioration diagnosis method for a power storage device based on a relationship between an OCV and a sum of discharge.

In the present embodiment, when there is a request for execution of deterioration diagnosis and when the prescribed conditions are satisfied, deterioration diagnosis process unit 202 causes battery 70 to be discharged at a fixed amount of discharge until the OCV of battery 70 changes from diagnosis start voltage OCV(0) to diagnosis completion voltage OCV (1) as shown in FIG. 3, and integrates the amount of discharge (current during discharging). Deterioration diagnosis process unit 202 compares a sum of discharge D(0) from diagnosis start voltage OCV(0) to diagnosis completion voltage OCV (1) and a sum of discharge D(1) from OCV(0) to OCV(1) when battery 70 is new, and diagnoses whether battery 70 has deteriorated or not.

Battery 70 may be discharged, for example, by using a discharge resistance provided in PCU 60 or by using first MG 20 or second MG 30, or may be discharged by operating electrical equipment other than PCU 60 connected to battery 70. The electrical equipment other than PCU 60 connected to battery 70 is, for example, a DC/DC converter and an air conditioner compressor.

Sum of discharge D(1) when battery 70 is new may be a prescribed value adapted by an experiment and the like. A sum of discharge when battery 70 is discharged at a fixed amount of discharge from diagnosis start voltage OCV(0) to diagnosis completion voltage OCV(1) during a prescribed period may be stored in a memory and the like as sum of discharge D(1). It is noted that the prescribed period includes, for example, a period in the manufacturing stage of vehicle 1, a period before shipment of vehicle 1, a period before vehicle 1 is delivered to the user, a period from delivery to the user to lapse of a prescribed period of use, or the like.

Deterioration diagnosis process unit 202 may diagnose that battery 70 has deteriorated, when an absolute value of a difference between sums of discharge D(0) and D(1) is equal to or larger than a threshold value, for example. Alternatively, deterioration diagnosis process unit 202 may diagnose that battery 70 has deteriorated, when a ratio of sum of discharge D(0) to sum of discharge D(1) is equal to or smaller than a threshold value. Alternatively, deterioration diagnosis process unit 202 may calculate a deterioration degree exhibiting a gradual or continuous change with respect to the aforementioned difference or ratio.

It is noted that not too small a value is, for example, set as the fixed amount of discharge in order to prevent unnecessary prolonging of a diagnosis time from the start to the end of deterioration diagnosis. In addition, not too large a value is set as the fixed amount of discharge in order to prevent deterioration of battery 70 due to the deterioration diagnosis. The fixed amount of discharge may be a prescribed value, or may be determined when discharging starts, based on a state of battery 70 or a state of auxiliary load and the like.

When it is diagnosed that battery 70 has deteriorated, deterioration diagnosis process unit 202, for example, notifies the driver or the operator to encourage replacement of battery 70. Deterioration diagnosis process unit 202 may, for example, cause a prescribed lamp of a meter (not shown) to light up, cause a display device to display a message that encourages replacement of battery 70, provide a notification of encouraging replacement of battery 70 by sound or voice, or cause the abnormality diagnosis device connected to vehicle 1 to display a message that encourages replacement of battery 70.

Deterioration diagnosis process unit 202 may turn a diagnosis request flag on when there is a request for execution of the deterioration diagnosis process for battery 70. Furthermore, during execution of the deterioration diagnosis process for battery 70, that is, during a period from the start to the end of deterioration diagnosis, deterioration diagnosis process unit 202 may turn on a diagnosis execution flag indicating that the deterioration diagnosis process is in execution.

Diagnosis determination unit 204 determines whether there is a request for execution of the deterioration diagnosis process for battery 70 or not and whether the deterioration diagnosis process for battery 70 is in execution or not. When both the diagnosis request flag and the diagnosis execution flag are ON, for example, diagnosis determination unit 204 may determine that there is a request for execution of the deterioration diagnosis process and that the deterioration diagnosis process for battery 70 is in execution. Diagnosis determination unit 204 may turn a diagnosis determination flag on when it is determined that there is a request for execution of the deterioration diagnosis process and that the deterioration diagnosis process for battery 70 is in execution, for example.

When diagnosis determination unit 204 determines that there is a request for execution of the deterioration diagnosis process for battery 70 and that the deterioration diagnosis process for battery 70 is in execution, startup suppression unit 206 suppresses startup of engine 10 until the deterioration diagnosis process for battery 70 is completed.

In the present embodiment, startup suppression unit 206 prohibits startup of engine 10 during a period from the start of the deterioration diagnosis process for battery 70 to the completion of the deterioration diagnosis process. In other words, even if the condition for starting up engine 10 is satisfied based on a state of vehicle 1, startup suppression unit 206 does not start up engine 10. Startup suppression unit 206, for example, invalidates a request for startup of engine 10, or delays execution of startup control based on the request for startup of engine 10 until the deterioration diagnosis process is completed.

In the present embodiment, the condition for starting up engine 10 is a condition other than a condition that the deterioration diagnosis process is completed, and includes, for example: a condition of IG ON; a condition that there is a request for warming up engine 10, such as, for example, that a cooling water temperature is equal to or lower than a threshold value; a condition that a brake is in the OFF state, such as, for example, that the depressing force of the brake pedal is equal to or smaller than a threshold value; a condition that power necessary for vehicle 1 exceeds an output of second MG 30 and must be made up for by an output of engine 10; and a condition that battery 70 must be charged using engine 10 because the SOC becomes smaller than a threshold value. It is noted that at least any one of the plurality of conditions listed above may only be included as the condition for starting up engine 10.

Completion determination unit 208 determines whether the deterioration diagnosis process for battery 70 has been completed. Completion determination unit 208 may determine that the deterioration diagnosis process for battery 70 has been completed, when the OCV has reached diagnosis completion voltage OCV(1) (has decreased), for example. Alternatively, completion determination unit 208 may determine that the deterioration diagnosis process for battery 70 has been completed, when after the start of the deterioration diagnosis process for battery 70, a prescribed time has elapsed, during which completion of the deterioration diagnosis process can be reliably determined, for example.

Completion determination unit 208 may turn a completion determination flag on when the deterioration diagnosis process for battery 70 has been completed, for example.

When completion determination unit 208 determines that the deterioration diagnosis process for battery 70 has been completed, suppression release unit 210 releases suppression of startup of engine 10. Suppression release unit 210 may release suppression of startup of engine 10 when the completion determination flag is in the OFF state, for example. After suppression of startup of engine 10 is released, the startup control over engine 10 may be executed by validating the invalidated request for startup of engine 10, or the startup control over engine 10 may be executed in response to a request for startup of engine 10 which is received after completion of the deterioration diagnosis process for battery 70.

Although deterioration diagnosis process unit 202, diagnosis determination unit 204, startup suppression unit 206, completion determination unit 208, and suppression release unit 210 shown in FIG. 2 are described in the present embodiment as realized through execution of a program stored in a memory by a CPU of ECU 200 and as functioning as software, they may be realized by hardware. It is noted that such a program is recorded in a storage medium for installation in vehicle 1.

Figure 4:
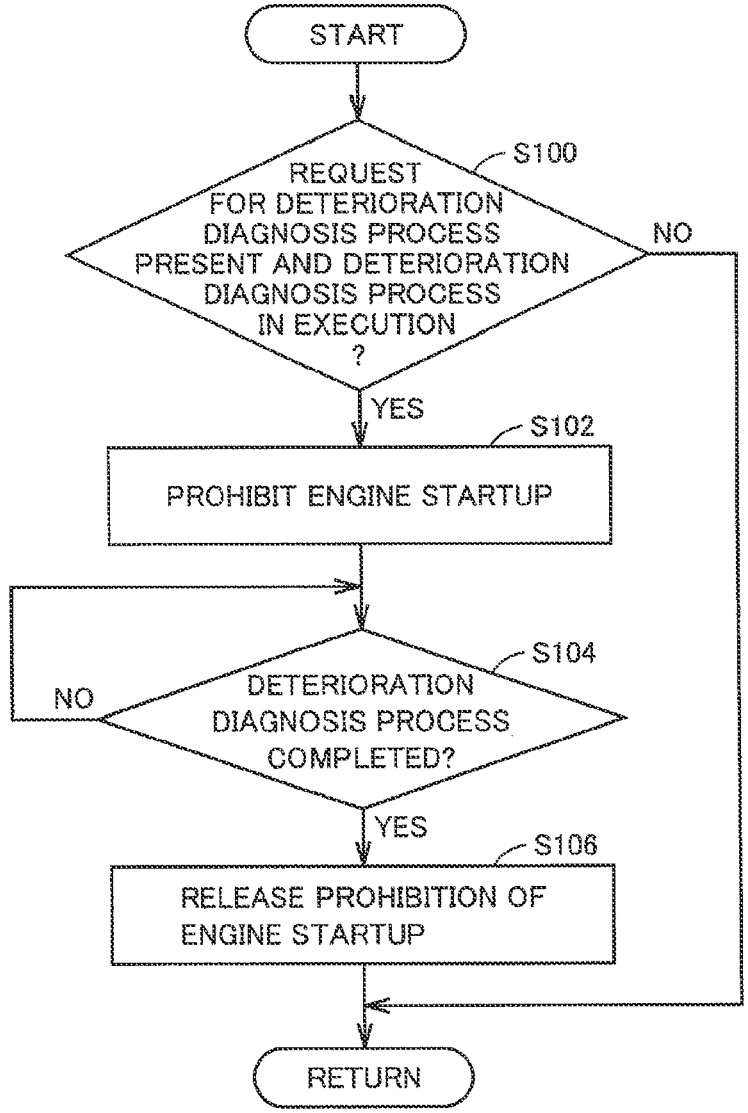
FIG. 4 is a flowchart showing a control structure of a program executed by the ECU mounted on the vehicle according to the first embodiment.

Referring to FIG. 4, a control structure of a program executed by ECU 200 mounted on vehicle 1 according to the present embodiment will be described.

In step ("step" will hereinafter be denoted as "S") 100, ECU 200 determines whether there is a request for execution of the deterioration diagnosis process for battery 70 or not and whether the deterioration diagnosis process is in execution or not. If there is a request for execution of the deterioration diagnosis process and if the deterioration diagnosis process is in execution (YES in S100), the process is transferred to S102. If not (NO in S100), this process ends. In S102, ECU 200 prohibits startup of engine 10.

In S104, ECU 200 determines whether the deterioration diagnosis process for battery 70 has been completed or not. If the deterioration diagnosis process for battery 70 has been completed (YES in S104), the process is transferred to S106. If not (NO in S104), the process is returned to S104. In S106, ECU 200 releases prohibition of startup of engine 10.

Operation of ECU 200 mounted on vehicle 1 according to the present embodiment based on the foregoing structure and flowchart will now be described with reference to FIG. 5.

Figure 5:
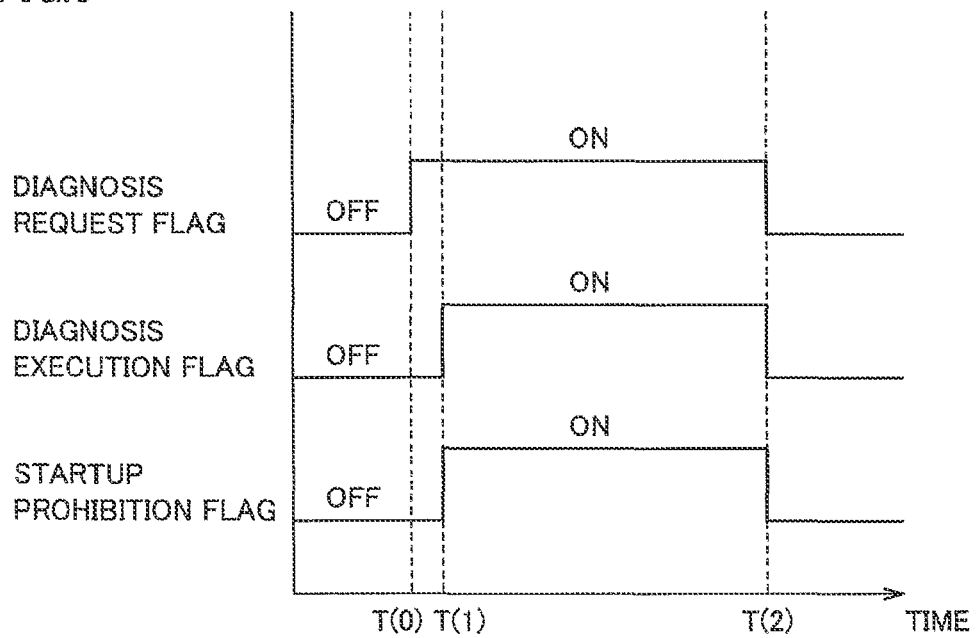
FIG. 5 is a timing chart showing operation of the ECU mounted on the vehicle according to the first embodiment.

As shown in FIG. 5, since the deterioration diagnosis process is not executed if there is no request for execution of the deterioration diagnosis process (NO in S100), for example, startup of engine 10 is not prohibited. Therefore, engine 10 is started up in response to a request for startup of engine 10.

On the other hand, since the deterioration diagnosis process is executed when there is a request for execution of the deterioration diagnosis process at time T(0) and when the prescribed conditions are satisfied at time T(1) (YES in S100), startup of engine 10 is prohibited (S102).

When the deterioration diagnosis process is executed, battery 70 is discharged at a fixed amount of discharge from a state where the OCV of battery 70 is equal to or higher than diagnosis start voltage OCV(0). When the OCV of battery 70 becomes equal to or lower than diagnosis completion voltage OCV(1) at time T(2), the deterioration diagnosis process is completed. ECU 200 diagnoses whether battery 70 has deteriorated or not, based on a result obtained by comparing sum of discharge D(0) when battery 70 is discharged until the OCV decreases from diagnosis start voltage OCV(0) to diagnosis completion voltage OCV(1) and sum of discharge D(1) when battery 70 is new.

Since the deterioration diagnosis process for battery 70 continues until time T(2) (NO in S104), the state where startup of engine 10 is prohibited continues. Therefore, even if there is a request for startup of engine 10, engine 10 is not started up.

On the other hand, when the deterioration diagnosis process for battery 70 is completed at time T(2) (YES in S104), prohibition of startup of engine 10 is released (S106). Therefore, when there is a request for startup of engine 10, engine 10 is started up using first MG 20.

In FIG. 5, the description has been provided that execution of the deterioration diagnosis process is started after reception of the request for execution of the deterioration diagnosis process. However, if the prescribed conditions are satisfied at the time of reception of the request for execution of the deterioration diagnosis process, the deterioration diagnosis process is executed from the time point of reception of the request for execution of the deterioration diagnosis process.

As described above, in vehicle 1 according to the present embodiment, startup of engine 10 is prohibited until the deterioration diagnosis process for battery 70 is completed. Since startup of engine 10 is prohibited, voltage fluctuations in battery 70 caused when engine 10 starts up are suppressed. Since the voltage fluctuations in battery 70 are suppressed, the sum of discharge can be calculated with high accuracy during execution of the deterioration diagnosis process for battery 70. Consequently, it can be precisely diagnosed whether battery 70 has deteriorated or not. Furthermore, since startup of engine 10 is prohibited, an opportunity to conduct deterioration diagnosis with high accuracy can be ensured. Therefore, there can be provided a vehicle and a deterioration diagnosis method for a power storage device, for determining, with high accuracy, whether the power storage device has deteriorated or not.

While FIG. 1 shows vehicle 1 having drive wheels 80 as front wheels by way of example, the present invention is not particularly limited to such a drive system. For example, vehicle 1 may have the drive wheels as rear wheels.

Furthermore, vehicle 1 is not particularly limited to the type of the hybrid vehicle shown in FIG. 1. For example, vehicle 1 may be a vehicle in which second MG 30 in FIG. 1 is omitted. Still alternatively, vehicle 1 may be a vehicle in which second MG 30 in FIG. 1 is coupled to a drive shaft for driving the rear wheels, instead of being coupled to drive shaft 16 of the front wheels. Moreover, a shifting mechanism may be provided between drive shaft 16 and speed reducer 58 or between drive shaft 16 and second MG 30. Furthermore, the power storage device may only be mounted on vehicle 1, and the present invention may be applied to, for example, a vehicle which uses only engine 10 as a drive source and on which an auxiliary battery is mounted.

Furthermore, while ECU 200 has been described as being a single ECU in FIG. 1, two or more ECUs may be used. For example, the operation of ECU 200 in FIG. 1 may be shared by an engine ECU for controlling engine 10 and a hybrid ECU for controlling PCU 60.

Furthermore, in the present embodiment, startup suppression unit 206 has been described as prohibiting startup of engine 10 from the time point of start of the deterioration diagnosis process. However, startup suppression unit 206 may prohibit startup of engine 10 at a time point after start of the deterioration diagnosis process. In other words, startup suppression unit 206 may prohibit startup of engine 10 after the time point of start of the deterioration diagnosis process.

Startup suppression unit 206 may prohibit startup of engine 10 when the OCV has reached a prescribed value OCV(2) (<OCV(0)) before reaching diagnosis completion voltage OCV(1), for example. With this, startup of engine 10 immediately before the OCV of battery 70 reaches diagnosis completion voltage OCV(1) can be prevented. Therefore, a decrease in accuracy of a diagnosis result because of a temporary decrease in the OCV to diagnosis completion voltage OCV(1) or lower, which is caused by voltage fluctuations due to startup of engine 10, can be suppressed.

In the present embodiment, the prescribed conditions have been described as including the condition that the OCV of battery 70 is equal to or higher than threshold value OCV(0). However, instead of this condition, the prescribed conditions may include a condition that the SOC of battery 70 is equal to or larger than a threshold value SOC(0), or may include a condition that voltage VB of battery 70 is equal to or higher than a threshold value VB(0). It is noted that threshold values SOC(0) and VB(0) are both values corresponding to OCV(0).

Furthermore, when the condition that the OCV of battery 70 is equal to or higher than threshold value OCV(0), of the prescribed conditions, is not satisfied, ECU 200 may execute the deterioration diagnosis process after engine 10 is started up and battery 70 is charged until the OCV of battery 70 becomes equal to or higher than threshold value OCV(0).

Furthermore, in the present embodiment, the description has been provided that deterioration diagnosis process unit 202 shown in FIG. 2 diagnoses whether battery 70 has deteriorated or not, based on the result obtained by comparing sum of discharge D(0) as a result of discharging battery 70 at a fixed amount of discharge from diagnosis start voltage OCV(0) to diagnosis completion voltage OCV(1) and sum of discharge D(1) when battery 70 is new. The deterioration diagnosis process is not, however, limited to such a process.

For example, deterioration diagnosis process unit 202 may repeat an operation of stopping discharging at a fixed amount of discharge immediately before the OCV of battery 70 reaches diagnosis completion voltage OCV(1), and then, directly detecting the OCV. With this, it can be determined with high accuracy whether the OCV of battery 70 has reached diagnosis completion voltage OCV(1) or not. It is noted that the aforementioned operation may be repeated at prescribed time intervals.

Alternatively, deterioration diagnosis process unit 202 may cause battery 70 to be discharged at a fixed amount of discharge until voltage VB changes from diagnosis start voltage VB(0) to a diagnosis completion voltage VB(1). In this case, deterioration diagnosis process unit 202 calculates a sum of discharge D(2) from diagnosis start voltage VB(0) to diagnosis completion voltage VB(1). Deterioration diagnosis process unit 202 diagnoses whether battery 70 has deteriorated or not, based on a result obtained by comparing calculated sum of discharge D(2) and a sum of discharge D(3) when battery 70 is new. Sum of discharge D(3) is a sum of discharge until voltage VB changes from diagnosis start voltage VB(0) to diagnosis completion voltage VB(1) when battery 70 is new.

Alternatively, deterioration diagnosis process unit 202 may calculate a sum of charge C(0) by charging battery 70 at a fixed amount of charge from a diagnosis start voltage OCV(3) to a diagnosis completion voltage OCV(4) (>OCV(3)) and integrating a charging current. Deterioration diagnosis process unit 202 may diagnose whether battery 70 has deteriorated or not, based on a result obtained by comparing calculated sum of charge C(0) and a sum of charge C(1) when battery 70 is new. Charging at a fixed amount of charge is implemented by, for example, charging by means of external power supply 302.

In this case, instead of the condition that the OCV of battery 70 is equal to or higher than threshold value OCV(0), the prescribed conditions include a condition that the OCV of battery 70 is equal to or lower than threshold value OCV(3).

Threshold value OCV(3) is a diagnosis start voltage. A value at which it is possible to ensure a sum of charge that allows acquisition of a diagnosis result with sufficient accuracy can be determined as threshold value OCV(3). The sum of charge refers to an integrated value of the amount of charge (charging current) when battery 70 is charged at a fixed amount of charge from diagnosis start voltage OCV(3) to diagnosis completion voltage OCV(4).

Preferably, it is desirable that threshold value OCV(3) should be a value close to the SOC corresponding to the lower limit value of the SOC of battery 70. Preferably, it is desirable that diagnosis completion voltage OCV(4) should be a value close to the SOC corresponding to the fully-charged state (upper limit value) of battery 70. With this, the diagnosis accuracy can be improved. The threshold value of the OCV, which is the prescribed condition, may also be a value smaller than OCV(3).

The diagnosis start voltage and the diagnosis completion voltage may also be a value of voltage VB instead of the OCV.

Instead of the condition that the OCV of battery 70 is equal to or lower than threshold value OCV(3), the prescribed conditions for executing the deterioration diagnosis process by charging at a fixed amount of charge may include a condition that the SOC of battery 70 is equal to or smaller than a threshold value SOC(1), or may include a condition that voltage VB of battery 70 is equal to or lower than threshold value VB(1). It is noted that threshold values SOC(1) and VB(1) are both values corresponding to OCV(3).

Furthermore, the prescribed conditions for executing the deterioration diagnosis process by charging at a fixed amount of charge or by discharging at a fixed amount of discharge may include a condition that engine 10 is in a stop state. Whether engine 10 is in a stop state or not may be determined based on a state of engine 10 (e.g., when engine rotational speed Ne is lower than a threshold value Ne(0), or the like) and a state of control over engine 10 (e.g., an IG OFF state, a state of selection of an accessory, control signal S2 is not output, or the like).

Furthermore, the prescribed conditions for executing the deterioration diagnosis process by charging at a fixed amount of charge or by discharging at a fixed amount of discharge may include a condition that vehicle 1 is in a stop state. Alternatively, the prescribed conditions may include a condition that vehicle 1 is in a traveling state. Whether vehicle 1 is in a stop state or in a traveling state may be determined based on vehicle speed V, rotational speed Nw of drive wheels 80 or rotational speed Nm2 of second MG 30. ECU 200 may determine that vehicle 1 is in a stop state, when vehicle speed V is smaller than a threshold value, for example. Alternatively, ECU 200 may determine that vehicle 1 is in a traveling state, when vehicle speed V is larger than the threshold value.

Second Embodiment

A vehicle according to a second embodiment will be described hereinafter. The vehicle according to the present embodiment differs from the configuration of vehicle 1 according to the aforementioned first embodiment in terms of the operation of ECU 200. The remaining configuration is the same as the configuration of vehicle 1 according to the aforementioned first embodiment. They are denoted by the same reference characters. The functions thereof are also the same. Accordingly, detailed description thereof will not be repeated here.

The present embodiment has a feature in that ECU 200 shuts off a gate of PCU 60 during execution of the deterioration diagnosis process for diagnosing whether battery 70 has deteriorated or not.

Figure 6:
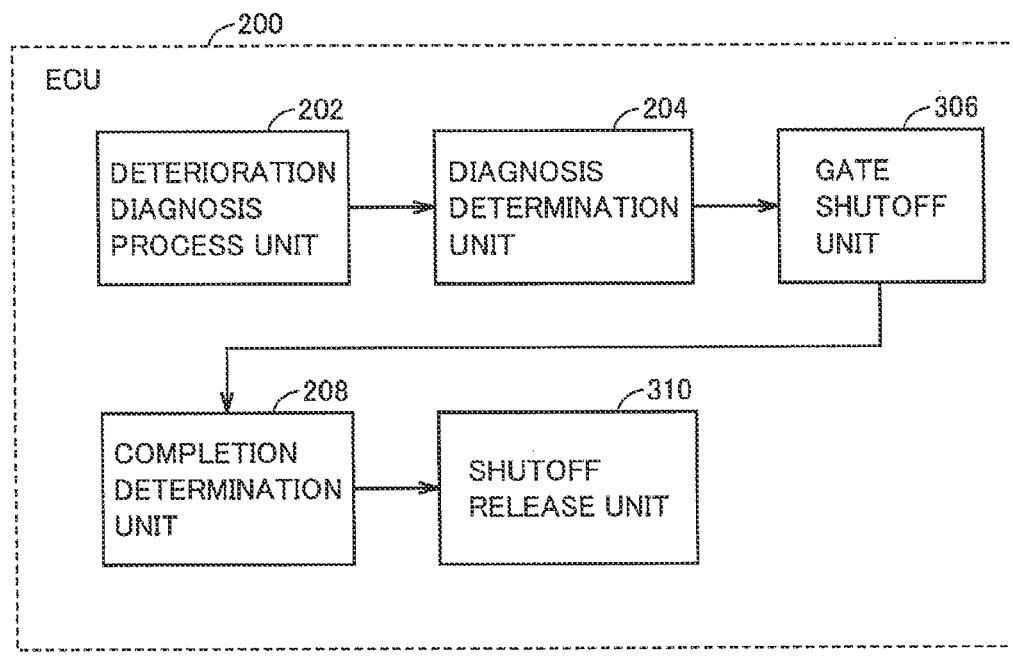
FIG. 6 is a functional block diagram of an ECU mounted on a vehicle according to a second embodiment.

FIG. 6 shows a functional block diagram of ECU 200 mounted on the vehicle according to the present embodiment. The functional block diagram of ECU 200 shown in FIG. 6 differs from the functional block diagram of ECU 200 in the first embodiment shown in FIG. 2 in that a gate shutoff unit 306 is included instead of startup suppression unit 206 and in that a shutoff release unit 310 is included instead of suppression release unit 210. The remaining configuration is the same as the configuration in the functional block diagram of ECU 200 shown in FIG. 2. Accordingly, detailed description thereof will not be repeated.

When diagnosis determination unit 204 determines that there is a request for execution of the deterioration diagnosis process for battery 70 and that the deterioration diagnosis process for battery 70 is in execution, gate shutoff unit 306 shuts off the gate of PCU 60. Gate shutoff unit 306 shuts off the gate of PCU 60 by turning off all of the plurality of switching elements 62 provided in PCU 60. By shutting off the gate of PCU 60, first MG 20 enters an inoperable state. Therefore, even if there is a request for startup of engine 10 based on a state of vehicle 1, engine 10 cannot be started up.

In the present embodiment, gate shutoff unit 306 is described as shutting off the gate of PCU 60 from the start to the completion of the deterioration diagnosis process for battery 70. Gate shutoff unit 306 may, however, shut off the gate of PCU 60 after the start of the deterioration diagnosis process for battery 70.

When completion determination unit 208 determines that the deterioration diagnosis process for battery 70 has been completed, shutoff release unit 310 releases shutoff of the gate of PCU 60. Shutoff release unit 310 may release shutoff of the gate of PCU 60 when the completion determination flag is in the OFF state, for example. After shutoff of the gate of PCU 60 is released, first MG 20 enters an operable state. Therefore, the startup control over engine 10 is executed in response to a request for startup of engine 10.

Although deterioration diagnosis process unit 202, diagnosis determination unit 204, gate shutoff unit 306, completion determination unit 208, and shutoff release unit 310 shown in FIG. 6 are described in the present embodiment as realized through execution of a program stored in a memory by a CPU of ECU 200 and as functioning as software, they may be realized by hardware. It is noted that such a program is recorded in a storage medium for installation in vehicle 1.

Referring to FIG. 7, a control structure of a program executed by ECU 200 mounted on vehicle 1 according to the present embodiment will be described.

In a flowchart shown in FIG. 7, the same step numbers are allotted to the same processes as those in the flowchart shown in FIG. 4 above. Processing thereof is also the same. Accordingly, detailed description thereof will not be repeated here.

If there is a request for execution of the deterioration diagnosis process for battery 70 and if the deterioration diagnosis process is in execution (YES in S100), ECU 200 shuts off the gate of PCU 60 by turning off the plurality of switching elements 62 in S200.

Furthermore, if the deterioration diagnosis process for battery 70 has been completed (YES in S104), ECU 200 releases shutoff of the gate of PCU 60 in S202.

Operation of ECU 200 mounted on vehicle 1 according to the present embodiment based on the foregoing structure and flowchart will now be described.

Since the deterioration diagnosis process is not executed if there is no request for execution of the deterioration diagnosis process (NO in S100), for example, the gate of PCU 60 is not shut off. Therefore, engine 10 is started up in response to a request for startup of engine 10.

On the other hand, since the deterioration diagnosis process is executed when there is a request for execution of the deterioration diagnosis process and when the prescribed conditions are satisfied (YES in S100), the gate of PCU 60 is shut off (S200).

When the deterioration diagnosis process is executed, battery 70 is discharged at a fixed amount of discharge from a state where the OCV of battery 70 is equal to or higher than diagnosis start voltage OCV(0). When the OCV of battery 70 becomes equal to or lower than diagnosis completion voltage OCV(1), the deterioration diagnosis process is completed. ECU 200 diagnoses whether battery 70 has deteriorated or not, based on a result obtained by comparing sum of discharge D(0) when battery 70 is discharged until the OCV decreases from diagnosis start voltage OCV(0) to diagnosis completion voltage OCV(1) and sum of discharge D(1) when battery 70 is new.

While the deterioration diagnosis process for battery 70 continues (NO in S104), shutoff of the gate of PCU 60 also continues. Therefore, even if there is a request for startup of engine 10, engine 10 is not started up because first MG 20 is in the inoperable state.

On the other hand, when the deterioration diagnosis process for battery 70 is completed (YES in S104), shutoff of the gate of PCU 60 is released (S202). Therefore, first MG 20 enters the operable state. Therefore, when there is a request for startup of engine 10, engine 10 is started up using first MG 20.

As described above, in vehicle 1 according to the present embodiment, the gate of PCU 60 remains shut off until the deterioration diagnosis process for battery 70 is completed. As a result of shutoff of the gate of PCU 60, engine 10 enters an unstartable state. Since engine 10 cannot be started up, voltage fluctuations in battery 70 caused when engine 10 starts up are suppressed. Since the voltage fluctuations in battery 70 are suppressed, the sum of discharge can be calculated with high accuracy during execution of the deterioration diagnosis process. Consequently, it can be precisely diagnosed whether battery 70 has deteriorated or not. Furthermore, since startup of engine 10 is prohibited, an opportunity to conduct deterioration diagnosis with high accuracy can be ensured. Therefore, there can be provided a vehicle and a deterioration diagnosis method, for determining, with high accuracy, whether a power storage device has deteriorated or not.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10 engine; 11 engine rotational speed sensor; 12 first resolver; 13 second resolver; 14 wheel speed sensor; 16 drive shaft; 20 first MG; 30 second MG; 40 power split device; 50 sun gear; 52 pinion gear; 54 carrier; 56 ring gear; 58 speed reducer; 60 PCU; 62 switching element; 70 battery; 78 charging device; 80 drive wheel; 82 drive shaft; 102 cylinder; 104 fuel injection device; 150 start switch; 156 battery temperature sensor; 158 current sensor; 160 voltage sensor; 200 ECU; 202 deterioration diagnosis process unit; 204 diagnosis determination unit; 206 startup suppression unit; 208 completion determination unit; 210 suppression release unit; 300 charging plug; 302 external power supply; 304 charging cable; 306 gate shutoff unit; 310 shutoff release unit.

The invention claimed is:

1. A vehicle, comprising:
an internal combustion engine;
a power storage device;
a rotating electric machine for receiving supply of power from said power storage device and starting up said internal combustion engine;
a detection unit for detecting a state of said power storage device; and
a control unit programmed to execute a deterioration diagnosis process for diagnosing whether said power storage device has deteriorated or not based on the state of said power storage device, when a prescribed condition is satisfied, wherein
said control unit suppresses startup of said internal combustion engine when a condition for starting up said internal combustion engine is satisfied before said deterioration diagnosis process is completed,
said prescribed condition includes the condition that a voltage of said power storage device is larger than a threshold value,
said control unit executes said deterioration diagnosis process when the voltage of said power storage device is larger than said threshold value, and
said control unit executes said deterioration diagnosis process after starting said internal combustion engine and charging said power storage device when the voltage of said power storage device is smaller than said threshold value.

2. The vehicle according to claim 1, wherein
said control unit prohibits startup of said internal combustion engine until said deterioration diagnosis process is completed.

3. The vehicle according to claim 2, wherein
said control unit delays startup of said internal combustion engine until said deterioration diagnosis process is completed.

4. The vehicle according to claim 1, wherein
said control unit releases suppression of startup of said internal combustion engine when said deterioration diagnosis process is completed.

5. The vehicle according to claim 1, wherein
when said prescribed condition is satisfied, said control unit diagnoses whether said power storage device has deteriorated or not, based on any one of an amount of charge and an amount of discharge of said power storage device when a voltage of said power storage device is changed from a diagnosis start voltage to a diagnosis end voltage.

6. The vehicle according to claim 5, wherein
said control unit suppresses startup of said internal combustion engine while the voltage of said power storage device is being changed from said diagnosis start voltage to said diagnosis end voltage.

7. The vehicle according to claim 5, wherein
said control unit suppresses startup of said internal combustion engine while the voltage of said power storage device is being changed from a prescribed voltage between said diagnosis start voltage and said diagnosis end voltage to said diagnosis end voltage.

8. The vehicle according to claim 1, further comprising:
a power conversion device for converting power of said power storage device into power supplied to said rotating electric machine, wherein
said control unit suppresses startup of said internal combustion engine by controlling said power conversion device to interrupt supply of the power to said rotating electric machine.

9. A deterioration diagnosis method for a power storage device, used in a vehicle including an internal combustion engine, a power storage device, and a rotating electric machine for receiving supply of power from said power storage device and starting up said internal combustion engine, the deterioration diagnosis method comprising the steps of:
detecting a state of said power storage device;
executing a deterioration diagnosis process for diagnosing whether said power storage device has deteriorated or not based on the state of said power storage device, when a prescribed condition is satisfied; and
suppressing startup of said internal combustion engine when a condition for starting up said internal combustion engine is satisfied before said deterioration diagnosis process is completed;
said prescribed condition including the condition that a voltage of said power storage device is larger than a threshold value,
the deterioration diagnosis method further comprising the steps of:
executing said deterioration diagnosis process when the voltage of said power storage device is larger than said threshold value; and
executing said deterioration diagnosis process after starting said internal combustion engine and charging said power storage device when the voltage of said power storage device is smaller than id threshold value.

* * * * *